United States Patent
Trachtman (10) Patent No.: US 10,101,940 B1
(45) Date of Patent: Oct. 16, 2018

(54) DATA RETRIEVAL SYSTEM AND METHOD

(71) Applicant: EMC Corporation, Hopkinton, MA (US)

(72) Inventor: Michael Trachtman, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 163 days.

(21) Appl. No.: 14/871,974

(22) Filed: Sep. 30, 2015

(51) Int. Cl.
 *G06F 13/00* (2006.01)
 *G06F 3/06* (2006.01)
 *G06F 12/0868* (2016.01)

(52) U.S. Cl.
 CPC .......... *G06F 3/0647* (2013.01); *G06F 3/0613* (2013.01); *G06F 3/0683* (2013.01); *G06F 12/0868* (2013.01); *G06F 2212/604* (2013.01)

(58) Field of Classification Search
 CPC ............... G06F 3/0647; G06F 3/0613; G06F 2212/604; G06F 3/0683; G06F 12/0868
 See application file for complete search history.

(56) References Cited

U.S. PATENT DOCUMENTS

| | | | | |
|---|---|---|---|---|
| 6,931,519 | B1* | 8/2005 | Keller | G06F 11/1417 713/1 |
| 7,921,179 | B1* | 4/2011 | Zheng | G06F 17/30165 709/213 |
| 2012/0036330 | A1* | 2/2012 | Saito | G06F 3/0617 711/162 |
| 2013/0080723 | A1* | 3/2013 | Sawa | G06F 3/0607 711/162 |
| 2016/0087833 | A1* | 3/2016 | Donahue | H04L 41/082 709/221 |

* cited by examiner

*Primary Examiner* — Nanci N Wong
(74) *Attorney, Agent, or Firm* — Mark H. Whittenberger; Heath M. Sargeant; Holland & Knight LLP (57) ABSTRACT

A method, computer program product, and computing system for identifying a data portion for relocation from a first storage device to a second storage device. The data portion is migrated from the first storage device to the second storage device. A read request is received on the second storage device for specific data included within the data portion. The specific data is not present in a backend cache system associated with the second storage device. The specific data is requested from the second storage device and a backend cache system associated with the first storage device.

18 Claims, 5 Drawing Sheets

DATA RETRIEVAL SYSTEM AND METHOD

TECHNICAL FIELD

This disclosure relates to storage systems and, more particularly, to systems and methods for retrieving data.

BACKGROUND

Storing and safeguarding electronic content is of paramount importance in modern business. Accordingly, various methodologies may be employed to protect such electronic content. One such methodology is to utilize multiple redundant systems to avoid downtime. Unfortunately, when such redundant systems are employed, procedures need to be employed that allow for the smooth transitioning from one resource to another.

SUMMARY OF DISCLOSURE

In one implementation, a computer-implemented method includes identifying a data portion for relocation from a first storage device to a second storage device. The data portion is migrated from the first storage device to the second storage device. A read request is received on the second storage device for specific data included within the data portion. The specific data is not present in a backend cache system associated with the second storage device. The specific data is requested from the second storage device and a backend cache system associated with the first storage device.

One or more of the following features may be included. If the specific data is first provided by the backend cache system associated with the first storage device, the read request may be satisfied with the specific data provided by the backend cache system associated with the first storage device. If the specific data is first provided by the second storage device, the read request may be satisfied with the specific data provided by the second storage device. Requesting the specific data from the second storage device and a backend cache system associated with the first storage device may include requesting the specific data from the backend cache system associated with the first storage device and the second storage device for a defined period of time. Requesting the specific data from the second storage device and a backend cache system associated with the first storage device may include requesting the specific data only from the second storage device after expiry of the defined period of time. The data portion may be a LUN. The first storage device and the second storage device may be data arrays.

In another implementation, a computer program product resides on a computer readable medium and has a plurality of instructions stored on it. When executed by a processor, the instructions cause the processor to perform operations including identifying a data portion for relocation from a first storage device to a second storage device. The data portion is migrated from the first storage device to the second storage device. A read request is received on the second storage device for specific data included within the data portion. The specific data is not present in a backend cache system associated with the second storage device. The specific data is requested from the second storage device and a backend cache system associated with the first storage device.

One or more of the following features may be included. If the specific data is first provided by the backend cache system associated with the first storage device, the read request may be satisfied with the specific data provided by the backend cache system associated with the first storage device. If the specific data is first provided by the second storage device, the read request may be satisfied with the specific data provided by the second storage device. Requesting the specific data from the second storage device and a backend cache system associated with the first storage device may include requesting the specific data from the backend cache system associated with the first storage device and the second storage device for a defined period of time. Requesting the specific data from the second storage device and a backend cache system associated with the first storage device may include requesting the specific data only from the second storage device after expiry of the defined period of time. The data portion may be a LUN. The first storage device and the second storage device may be data arrays.

In another implementation, a computing system including a processor and memory is configured to perform operations including identifying a data portion for relocation from a first storage device to a second storage device. The data portion is migrated from the first storage device to the second storage device. A read request is received on the second storage device for specific data included within the data portion. The specific data is not present in a backend cache system associated with the second storage device. The specific data is requested from the second storage device and a backend cache system associated with the first storage device.

One or more of the following features may be included. If the specific data is first provided by the backend cache system associated with the first storage device, the read request may be satisfied with the specific data provided by the backend cache system associated with the first storage device. If the specific data is first provided by the second storage device, the read request may be satisfied with the specific data provided by the second storage device. Requesting the specific data from the second storage device and a backend cache system associated with the first storage device may include requesting the specific data from the backend cache system associated with the first storage device and the second storage device for a defined period of time. Requesting the specific data from the second storage device and a backend cache system associated with the first storage device may include requesting the specific data only from the second storage device after expiry of the defined period of time. The data portion may be a LUN. The first storage device and the second storage device may be data arrays.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
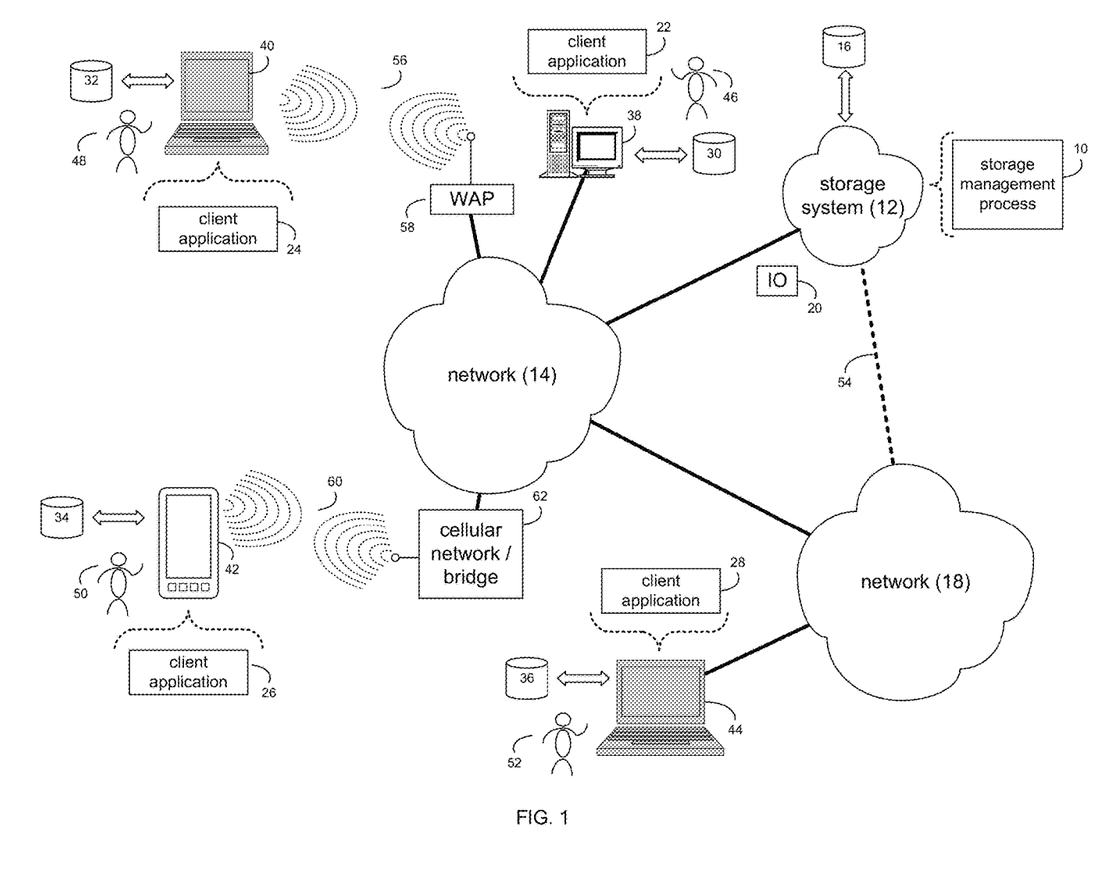
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
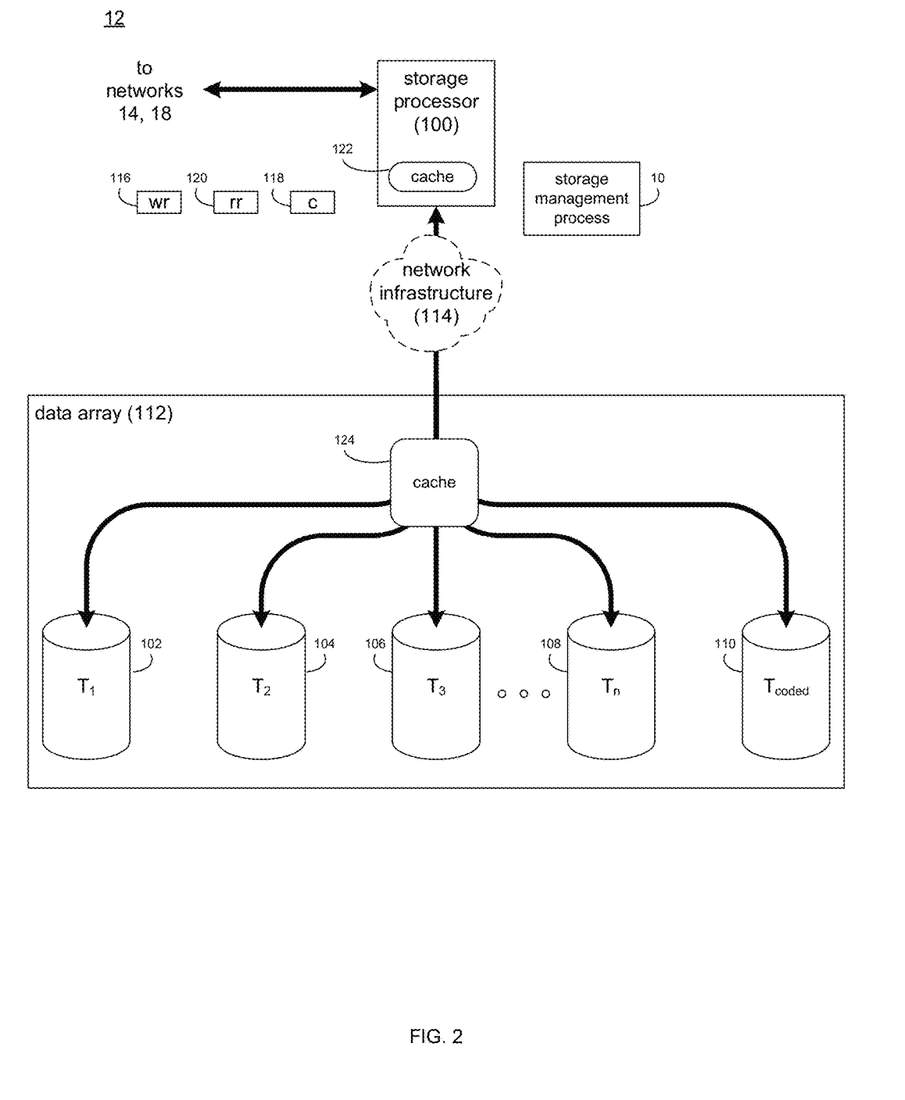
FIG. 2 is a diagrammatic view of the storage system of FIG. 1.

Referring also to FIG. 2, storage system 12 may include storage processor 100 and a plurality of storage targets T 1-n (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/ performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Figure 3:
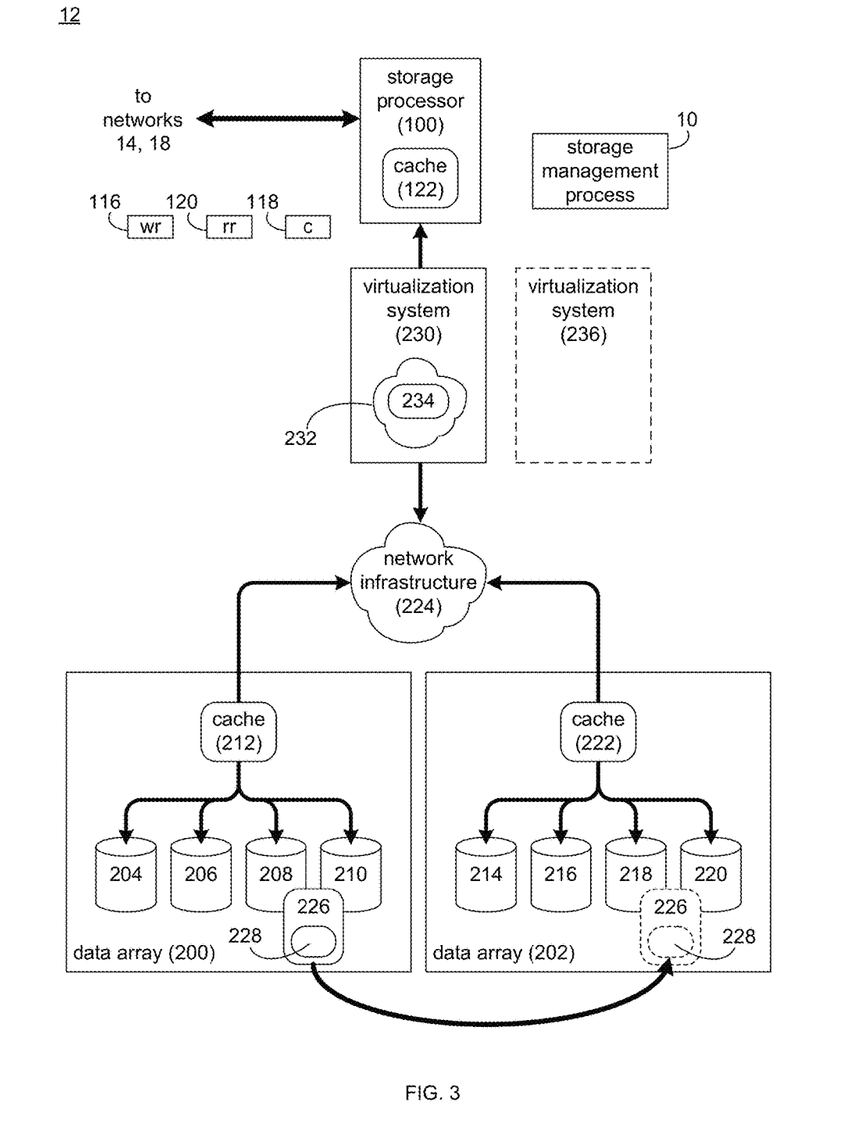
FIG. 3 is a diagrammatic view of another embodiment of the storage system of FIG. 1.

The Storage Management Process:

Referring also to FIG. 3, there is shown another implementation of storage system 12 that includes two separate and distinct data arrays (e.g., data arrays 200, 202). For illustrative purposes only, the first data array (e.g., data array 200) is shown to include four storage targets (e.g., storage targets 204, 206, 208, 210) and backend cache memory system 212. Further, the second data array (e.g., data array 202) is shown to include four storage targets (e.g., storage targets 214, 216, 218, 220) and backend cache memory system 222. Storage processor 100, data array 200 and data array 202 may be coupled using network infrastructure 224, examples of which may include but are not limited to an Ethernet (e.g., Layer 2 or Layer 3) network, a fiber channel network, an InfiniBand network, or any other circuit switched/packet switched network.

For the following example, assume that data arrays 200, 202 may include functionality that may be configured to define and expose one or more logical units that users of storage processor 100 may use and access to store data.

Specifically, assume that data array 200 defines and exposes LUN 226 that may allow for the storage of data within data array 200.

Further and as discussed above, during the operation of data array 200, content (e.g., content 118) to be written to data array 200 may be received from storage processor 100 and initially stored within backend cache memory system 212 prior to being stored on e.g. one or more of storage targets 204, 206, 208, 210. Accordingly, during use of data array 200 and LUN 226, backend cache memory system 212 may be populated (i.e., warmed) and, therefore, subsequent read requests made to LUN 226 may be satisfied by backend cache memory system 212 (i.e., if the content requested in the read request is present within backend cache memory system 212), thus avoiding the need to obtain the content from storage targets 204, 206, 208, 210 (which would typically be slower).

Assume for the following example that LUN 226 needs to be migrated from data array 200 to data array 202, which may be required for various reasons (e.g., maintenance of data array 200, one or more components of data array 200 being decommissioned, one or more components of data array 200 being sold/coming off lease or load balancing between data arrays).

Figure 4:
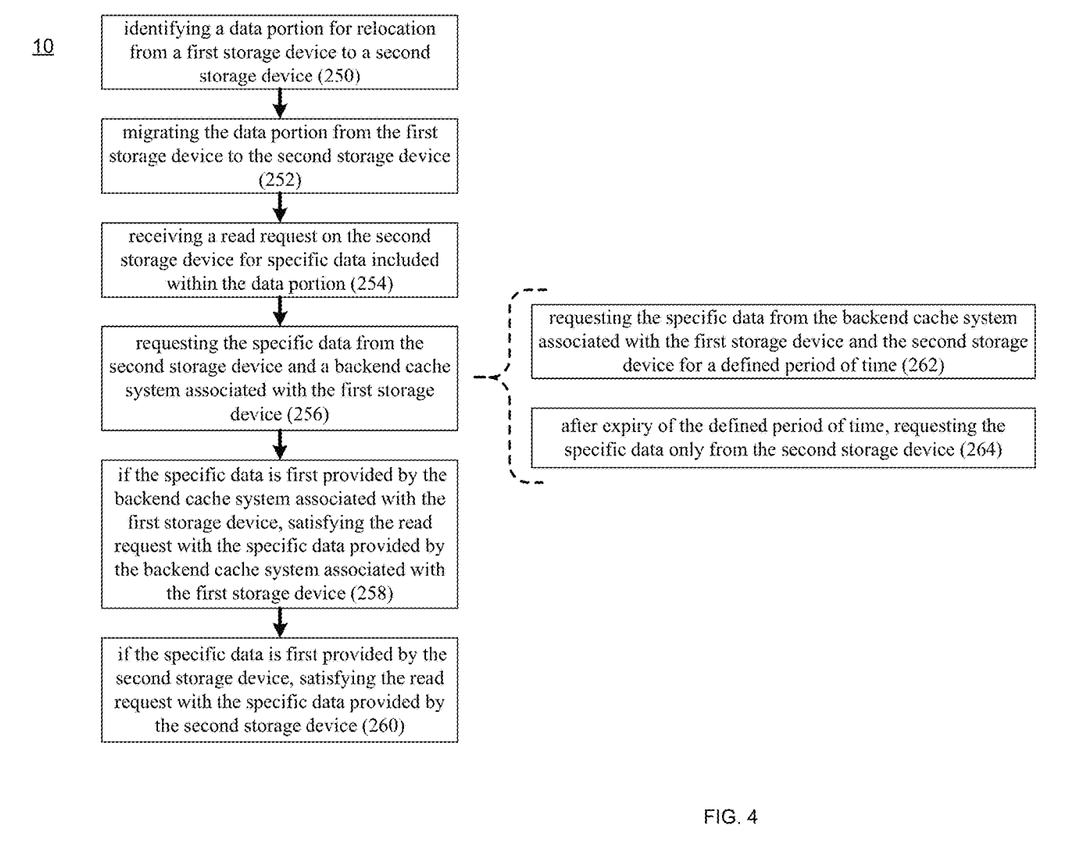
FIG. 4 is a flow chart of the storage management process of FIG. 1.

Referring also to FIG. 4, storage management process 10 may identify 250 a data portion (e.g., LUN 226) for relocation from a first storage device (e.g., data array 200) to a second storage device (e.g., data array 202). When identifying 250 the data portion for relocation, a user of storage management process 10 (e.g., an administrator of storage system 12) may utilize storage management process 10 to select LUN 226 as the data portion to be moved. Alternatively, the user of storage management process 10 (e.g., an administrator of storage system 12) may utilize an application, an applet, a utility or a routine that is external to storage management process 10 to identify 250 the data portion (e.g., LUN 226) for relocation, examples of which may include but are not limited to data center management software (not shown).

While, in this example, the data portion to be relocated is a LUN, this is for illustrative purposes only and is not intended to be a limitation of this disclosure, as other configurations are possible. For example, the data portion to be relocated may be smaller (e.g., a database file) or may be larger (e.g., the entire content of data array 200).

While, in this example, the first and second storage devices are described as being data arrays 200, 202, this is for illustrative purposes only and is not intended to be a limitation of this disclosure, as other configurations are possible. For example, the first and second storage devices may be smaller (e.g., a single hard disk drive) or may be larger (e.g., a SAN).

Storage management process 10 may migrate 252 the data portion (e.g., LUN 226) from the first storage device (e.g., data array 200) to the second storage device (e.g., data array 202). Alternatively, the user of storage management process 10 (e.g., an administrator of storage system 12) may utilize an application, an applet, a utility or a routine that is external to storage management process 10 to migrate 252 the data portion (e.g., LUN 226).

Federated Block Storage (FBS) Migration

When migrating 252 LUN 226 from data array 200 to data array 202, one example of the manner in which this migration 252 may occur is via a Federated Block Storage (FBS) migration. As is known in the art, when performing a Federated Block Storage (FBS) migration, the volume may have a SCSI ID that does not change.

Some modifications may be made to the ALUA specification. As is known in the art, ALUA is an industry standard protocol for identifying optimized paths between a storage system and a host. ALUA may enable the initiator to query the target about path attributes (such as primary path and secondary path). ALUA may also allow the target to communicate events back to the initiator.

Concerning the actual "movement" of the data (e.g., LUN 226), this movement may be accomplished via one of many mechanisms. For example, many storage systems (such as VPLEX or VMAX, both of which are offered by EMC of Hopkinton, Mass.) have built in procedures and mechanisms that allow for the "movement" of such data (e.g., LUN 226). For example, one common methodology is to position the second storage device (e.g., data array 202) "in front of" the first storage device (e.g., data array 200).

Figure 5:
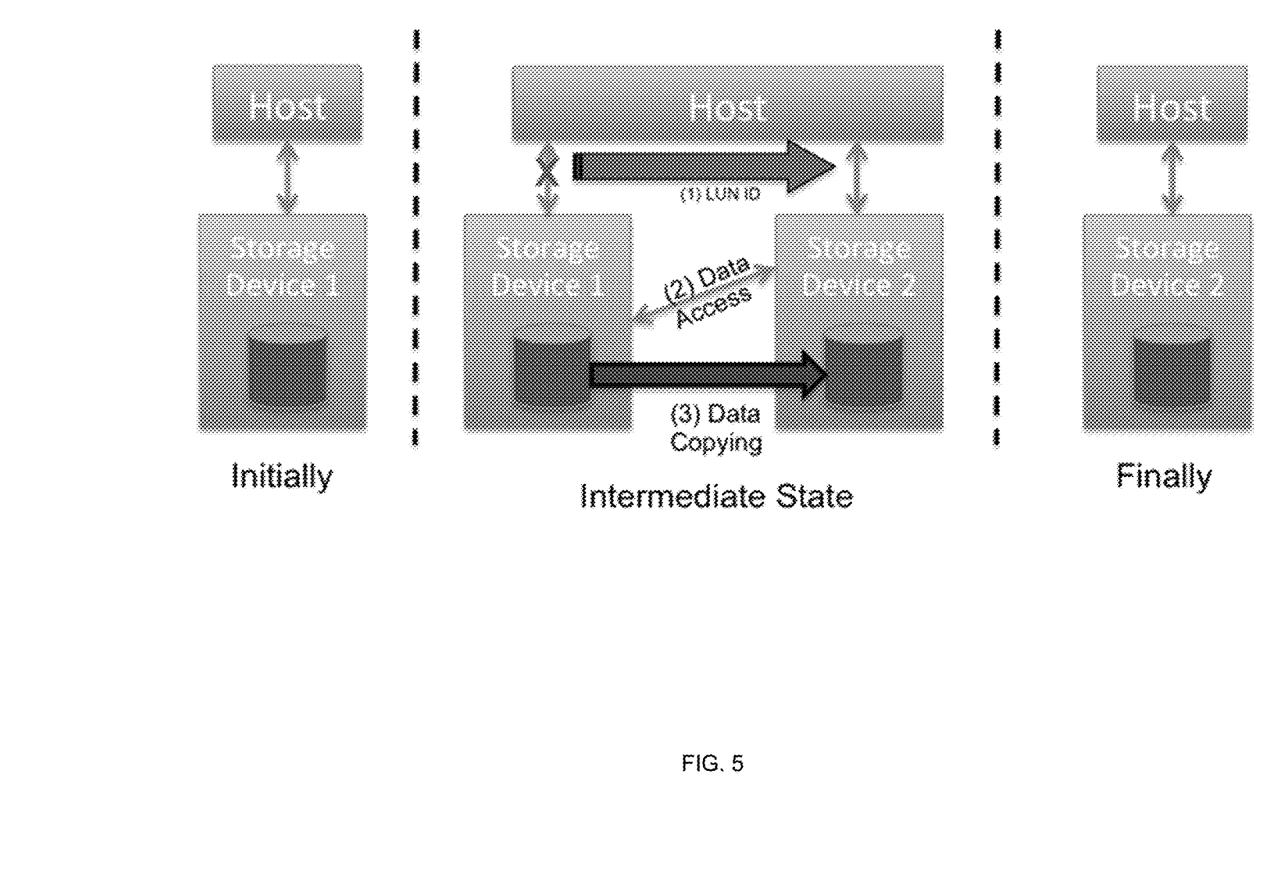
FIG. 5 is a diagrammatic view of another embodiment of the storage system of FIG. 1.

Referring also to FIG. 5, it is shown that there is an initial state, a final state, and an intermediate state concerning the movement of data. As shown in the intermediate state, in Step 1, the LUN ID is non-disruptively transferred from Storage Device 1 to Storage Device 2. And then, as shown in Step 2, Storage Device 2 has access to the data within Storage Device 1 and may respond to IO requests from the Host. In Step 3 within the intermediate state, Storage Device 2 may now copy the data from Storage Device 1 to Storage Device 2. This copying procedure may take a relatively short amount of time or a considerably amount of time depending upon e.g., available bandwidth and the size of the data. When the copying procedure has completed, the connections between Storage Device 1 and Storage Device 2 may be severed. At that time, since all the data is now on Storage Device 2, Storage Device 2 may access the data locally and respond to IO requests from the host.

Continuing with the above-stated example, assume that storage management process 10 successfully migrated 252 LUN 226 from the first storage device (e.g., data array 200) to the second storage device (e.g., data array 202), resulting in LUN 226 now being present on the second storage device (e.g., data array 202).

Assume that storage management process 10 receives 254 a read request (e.g., read request 120) on the second storage device (e.g., data array 202) for specific data (e.g., specific data 228) included within the data portion (e.g., LUN 226).

Assume for the following example that this specific data (e.g., specific data 228) has not been read since the migration 252 of LUN 226 from data array 200 to data array 202. Accordingly, assume that specific data 228 is not present within the backend cache system (e.g., backend cache system 222) associated with the second storage device (e.g., data array 202).

Accordingly, storage management process 10 may request 256 the specific data (e.g., specific data 228) from both the second storage device (e.g., data array 202) and a backend cache system (e.g., backend cache system 212) associated with the first storage device (e.g., data array 200). By requesting 256 specific data 228 from both data array 202 and backend cache system 212 of data array 200, a higher level of performance may be achieved. Specifically, if specific data 228 is available from backend cache system 212 of data array 200, storage management process 10 may likely to be able to satisfy read request 120 quicker than if specific data 228 is obtained data array 220 (due to the relatively slow response time of storage targets 214, 216, 218, 220 when compared to the relatively quick response time of backend cache system 212.

Accordingly, if the specific data (e.g., specific data 228) is first provided by the backend cache system (e.g., backend cache system 212) associated with the first storage device (e.g., data array 200), storage management process 10 may satisfy 258 read request 120 with the specific data (e.g., specific data 228) provided by backend cache system 212 associated with the first storage device (e.g., data array 200).

Conversely, if the specific data (e.g., specific data 228) is first provided by the second storage device (e.g., data array 202), storage management process 10 may satisfy 260 read request 120 with the specific data (e.g., specific data 228) provided by storage targets 214, 216, 218, 220 of the second storage device (e.g., data array 202). This may occur if e.g., the specific data (e.g. specific data 228) is no longer available in the backend cache system (e.g. backend cache system 212) because it has been evicted by that cache.

The above-described procedure may be continued for as long as the procedure provides a level of performance enhancement to storage system 12. For example, the above-described procedure may continue to provide a level of performance enhancement until the backend cache system (e.g., backend cache system 222) associated with the second storage device (e.g., data array 202) is warmed (e.g., populated with data that is present within data array 202).

Accordingly and when requesting 256 the specific data (e.g., specific data 228) from both the second storage device (e.g., data array 202) and the backend cache system (e.g., backend cache system 212) associated with the first storage device (e.g., data array 200), storage management process 10 may request 262 the specific data (e.g., specific data 228) from backend cache system 212 associated with the first storage device (e.g., data array 200) and the second storage device (e.g., data array 202) for only a defined period of time; wherein after the expiry of the defined period of time, storage management process 10 may request 264 the specific data (e.g., specific data 228) only from the second storage device (e.g., data array 202).

Concerning the above-mentioned defined period of time, this period of time may be based upon the "known" cache life time. For example, if the cache life time for backend cache system 212 is 10 minutes, this defined period of time may be set as 10 minutes. Probabilities may be applied concerning this period of time, wherein e.g., if 90% of the data "falls off the cache" in 8 minutes, then storage management process 10 may stop querying backend cache system 212 associated with data array 200 after 8 minutes.

Storage system 12 may further include one or more virtualization appliances (e.g., virtualization system 230) that may allow for seamless access to one or both of data arrays 200, 202 and the various data portions contained/defined therein (e.g., LUN 226). During operation, virtualization system 230 may execute one or more virtual machine operating environments (e.g., virtual machine operating environment 232). An example of virtual machine operating environment 232 may include but is not limited to a hypervisor, which is an instantiation of an operating system that may allow for one or more virtual machines (e.g., virtual machine 234) to operate within a single physical device. Accordingly, the combination of virtualization system 230, virtual machine operating environment 232, and virtual machine 234 may allow one or more users to access the resources of data arrays 200, 202.

Additionally, the above-referenced storage devices between which data is migrated 252 need not be data arrays and may include any device that stores (or is capable of storing) data. Accordingly, another example of a storage device may include but is not limited to a virtualization appliance (e.g., virtualization system 230).

Accordingly, storage management process 10 may be utilized to migrate 252 data present on one virtualization appliance (e.g., virtualization system 230) to another virtualization appliance (e.g., virtualization system 236). And, as discussed above, in the event that the new virtualization appliance (e.g., virtualization system 236) receives 254 a read request for a specific piece of content that that was initially present on the old virtualization appliance (e.g., virtualization system 230), storage management process 10 may request 256 the specific piece of content from both the new virtualization appliance (e.g., virtualization system 236) and a cache system (not shown) associated with the old virtualization appliance (e.g., virtualization system 230). As discussed above, by requesting 256 the specific piece of content from both virtualization system 236 and a cache system (not shown) associated with virtualization system 230), a higher level of performance may be achieved.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving a write request with write data at a storage processor, wherein the storage processor is coupled to a first storage device and a second storage device using a network infrastructure;
storing the write data initially to a front end cache of the storage processor;
subsequently storing the write data to the first storage device; wherein the write data is stored in a backend cache of the first storage device prior to storing the write data in the first storage device;
identifying a data portion for relocation from the first storage device to the second storage device;
migrating the data portion from the first storage device to the second storage device;
receiving a read request on the second storage device for specific data included within the data portion after the data portion is migrated from the first storage device to the second storage device, wherein the specific data is not present in a backend cache system associated with the second storage device;
determining a threshold of time that more than half of cache data in the backend cache system associated with the first storage reach their caching life time;
requesting the specific data from the second storage device and the backend cache system associated with the first storage device, wherein requesting the specific data from the second storage device and the backend cache system associated with the first storage device includes requesting the specific data from the backend cache system associated with the first storage device for a defined period of time, wherein the defined period of time is determined in response to the age of the specific data stored in the backend cache system of the first storage device being less than the threshold.

2. The computer-implemented method of claim 1 further comprising:

if the specific data is first provided by the backend cache system associated with the first storage device, satisfying the read request with the specific data provided by the backend cache system associated with the first storage device.

3. The computer-implemented method of claim 1 further comprising:
if the specific data is first provided by the second storage device, satisfying the read request with the specific data provided by the second storage device.

4. The computer-implemented method of claim 1 wherein requesting the specific data from the second storage device and the backend cache system associated with the first storage device includes: after expiry of the defined period of time, requesting the specific data only from the second storage device.

5. The computer-implemented method of claim 1 wherein the data portion is a LUN.

6. The computer-implemented method of claim 1 wherein the first storage device and the second storage device are data arrays.

7. A computer program product residing on a non-transitory computer readable medium having a plurality of instructions stored thereon which, when executed by a processor, cause the processor to perform operations comprising:
receiving a write request with write data at a storage processor, wherein the storage processor is coupled to a first storage device and a second storage device using a network infrastructure;
storing the write data initially to a front end cache of the storage processor;
subsequently storing the write data to the first storage device; wherein the write data is stored in a backend cache of the first storage device prior to storing the write data in the first storage device;
identifying a data portion for relocation from the first storage device to the second storage device;
migrating the data portion from the first storage device to the second storage device;
receiving a read request on the second storage device for specific data included within the data portion after the data portion is migrated from the first storage device to the second storage device, wherein the specific data is not present in a backend cache system associated with the second storage device;
determining a threshold of time that more than half of cache data in the backend cache system associated with the first storage reach their caching life time;
requesting the specific data from the second storage device and the backend cache system associated with the first storage device, wherein requesting the specific data from the second storage device and the backend cache system associated with the first storage device includes requesting the specific data from the backend cache system associated with the first storage device for a defined period of time, wherein the defined period of time is determined in response to the age of the specific data stored in the backend cache system of the first storage device being less than the threshold.

8. The computer program product of claim 7 further comprising:
if the specific data is first provided by the backend cache system associated with the first storage device, satisfying the read request with the specific data provided by the backend cache system associated with the first storage device.

9. The computer program product of claim 7 further comprising;
if the specific data is first provided by the second storage device, satisfying the read request with the specific data provided by the second storage device.

10. The computer program product of claim 7 wherein requesting the specific data from the second storage device and the backend cache system associated with the first storage device includes: after expiry of the defined period of time, requesting the specific data only from the second storage device.

11. The computer program product of claim 7 wherein the data portion is a LUN.

12. The computer program product of claim 7 wherein the first storage device and the second storage device are data arrays.

13. A computing system including a processor and memory configured to perform operations comprising:
receiving a write request with write data at a storage processor, wherein the storage processor is coupled to a first storage device and a second storage device using a network infrastructure;
storing the write data initially to a front end cache of the storage processor;
subsequently storing the write data to the first storage device; wherein the write data is stored in a backend cache of the first storage device prior to storing the write data in the first storage device;
identifying a data portion for relocation from the first storage device to the second storage device;
migrating the data portion from the first storage device to the second storage device;
receiving a read request on the second storage device for specific data included within the data portion after the data portion is migrated from the first storage device to the second storage device, wherein the specific data is not present in a backend cache system associated with the second storage device;
determining a threshold of time that more than half of cache data in the backend cache system associated with the first storage reach their caching life time;
requesting the specific data from the second storage device and the backend cache system associated with the first storage device, wherein requesting the specific data from the second storage device and the backend cache system associated with the first storage device includes requesting the specific data from the backend cache system associated with the first storage device for a defined period of time, wherein the defined period of time is determined in response to the age of the specific data stored in the backend cache system of the first storage device being less than the threshold.

14. The computing system of claim 13 further comprising:
if the specific data is first provided by the backend cache system associated with the first storage device, satisfying the read request with the specific data provided by the backend cache system associated with the first storage device.

15. The computing system of claim 13 further comprising;
if the specific data is first provided by the second storage device, satisfying the read request with the specific data provided by the second storage device.

16. The computing system of claim 13 wherein requesting the specific data from the second storage device and the backend cache system associated with the first storage device includes: after expiry of the defined period of time, requesting the specific data only from the second storage device.

17. The computing system of claim 13 wherein the data portion is a LUN.

18. The computing system of claim 13 wherein the first storage device and the second storage device are data arrays.

\* \* \* \* \*